D. R. NICHOLS.
Animal-Trap.
No. 204,753.  Patented June 11, 1878.
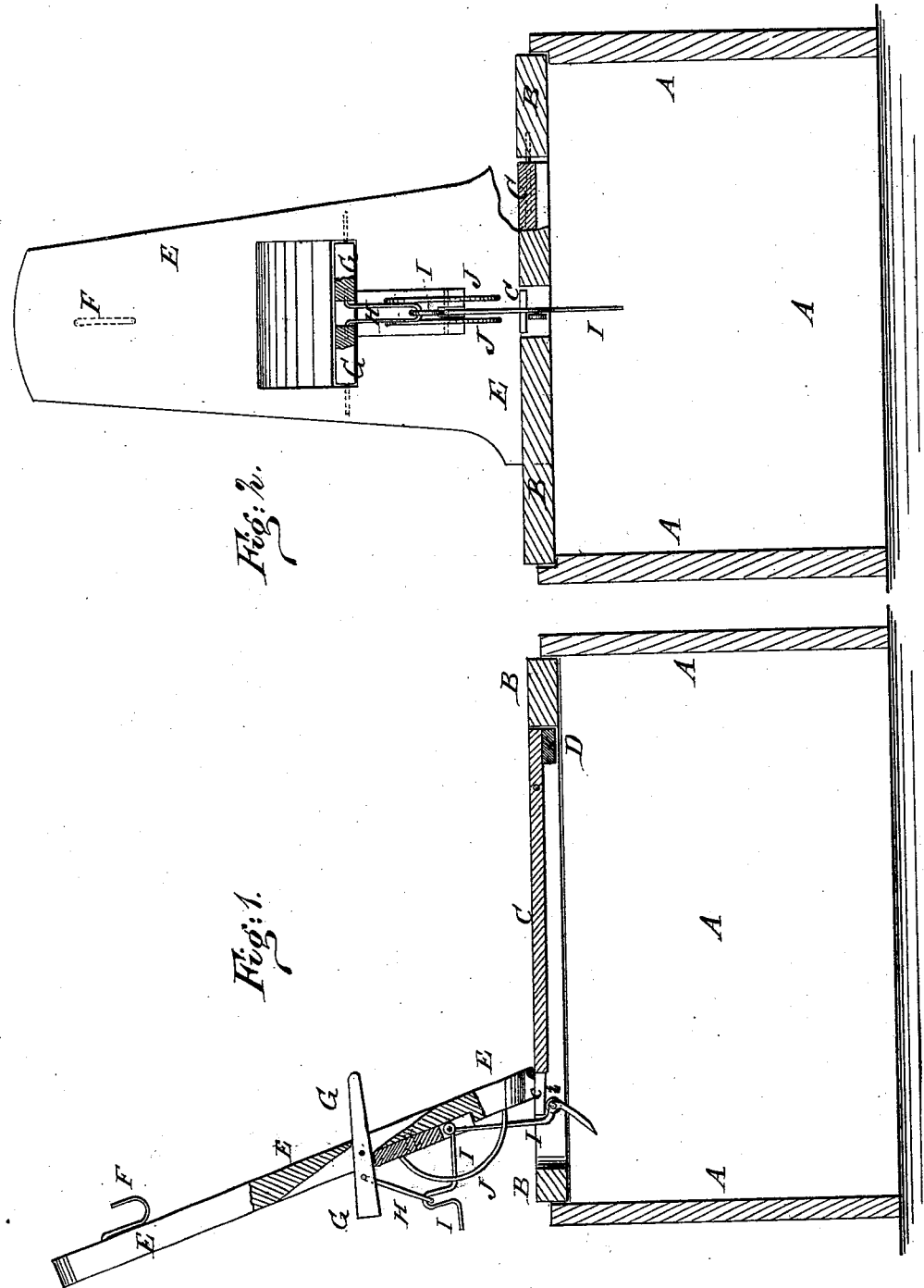
WITNESSES:
INVENTOR:
D. R. Nichols
BY
ATTORNEYS.

UNITED STATES PATENT OFFICE.

DAVID R. NICHOLS, OF ALEXANDRIA BAY, NEW YORK.

IMPROVEMENT IN ANIMAL-TRAPS.

Specification forming part of Letters Patent No. 204,753, dated June 11, 1878; application filed January 17, 1878.

*To all whom it may concern:*

Be it known that I, DAVID R. NICHOLS, of Alexandria Bay, in the county of Jefferson and State of New York, have invented a new and Improved Self-Setting Animal-Trap, of which the following is a specification:

Figure 1 is a vertical longitudinal section of my improved trap. Fig. 2 is a vertical cross-section of the same.

The object of this invention is to furnish an improved animal-trap which shall be simple in construction and reliable in use, and which shall be so constructed as to set itself after each animal has been caught, and leave no trace of the trapped animal to frighten away those that may come afterward.

The invention will first be described in connection with the drawing, and then pointed out in the claim.

A represents a box, barrel, or other suitable vessel, which may contain water, or may be set over a vessel containing water, or over a cage.

To the top of the box A is fitted a frame or platform, B, the middle part of which is cut away, and has a door, C, fitted into the opening thus formed.

The door C is pivoted, near its rear end, to the frame or platform B, and to the lower side of its rear end is attached a weight, D, sufficient to raise the said door into a horizontal position when left free.

To the forward part of the platform or frame B is rigidly attached the lower end of a slightly-inclined board, E, to the upper part of which is attached the bait-hook F.

In the middle part of the board E is formed a transverse slot, in which is pivoted a trip-board, G. The board G is beveled upon its opposite sides, above and below its slot, as shown in Figs. 1 and 2.

To the trip-board G are pivoted the ends of a loop, H, which interlocks with a loop formed upon the upper arm of the bent lever I.

The lever I is pivoted at its angle to the inclined board E, and its lower arm passed down through a slot in the forward part of the frame or platform B, and has a shoulder formed upon it to catch upon the lower edge of the trip-door C, to hold the said door firmly, so that the animal trapped for can walk over all parts of the said door without feeling it yield beneath him.

The lower end of the lever I, below its catch-shoulder, is inclined outward, as shown in Fig. 1, so that the forward end of the door C, as it rises, may push the said catch-lever I outward, pass above, and be caught and held by the said shoulder.

The shoulder of the catch-lever I has a small friction-roller, *i*, pivoted to it, to cause it to move easier upon the said door C.

The arms of the catch-lever I move between two curved guide-rods, J, attached to the inclined board E.

With this construction, as the animal steps upon the frame or platform B and the trip-door C, everything seems firm and secure, and he sees nothing to prevent his escape at any time. In seeking to reach the bait he places his fore feet upon the trip-board G, which withdraws the catch-lever I from the end of the trip-door C, and the animal falls into the box A. As the animal slips from the door C the weight D brings the said door back into a horizontal position, and the trap is again set for another animal.

I am aware that it is not new in animal-traps to use a weighted trap-door retained by a catch-lever connected with a swinging bait-arm, or to combine with this a swinging apron with inclined bottom lever; but by using a rigid bait-board, E, and pivoting the lever G in a hole of the board E, the animal is not able to put his foot on anything that will prevent the tripping of the catch-lever. Hence,

What I claim is—

The combination, with the catch-lever that has the friction-roller *i* on a bend thereof, and holds the tilting platform of an animal-trap, of the lever G, passing through and balanced on a vertical bait-board, E, beneath the bait-hook, as and for the purpose specified.

DAVID RICHARDSON NICHOLS.

Witnesses:
EBENEZER CAMPBELL,
WM. H. THOMPSON.